United States Patent
Kobayashi

[11] Patent Number: 5,946,319
[45] Date of Patent: Aug. 31, 1999

[54] ISDN COMMUNICATION APPARATUS

[75] Inventor: Yoshikazu Kobayashi, Tokyo, Japan

[73] Assignee: NEC Corporation, Japan

[21] Appl. No.: 08/888,272

[22] Filed: Jul. 3, 1997

[30] Foreign Application Priority Data

| Jul. 4, 1996 | [JP] | Japan | 8-175287 |
| Jul. 22, 1996 | [JP] | Japan | 8-191287 |
| Aug. 2, 1996 | [JP] | Japan | 8-205118 |

[51] Int. Cl.[6] .................................................. H04J 3/12
[52] U.S. Cl. ........................................ 370/420; 370/522
[58] Field of Search ............................ 370/259, 419, 370/420, 421, 358, 359, 522, 93.01, 93.05, 93.06

[56] References Cited

U.S. PATENT DOCUMENTS

| 4,592,047 | 5/1986 | Fundneider | 370/420 |
| 5,008,884 | 4/1991 | Yazawa et al. | 370/384 |
| 5,142,525 | 8/1992 | Nakatsuma | 370/524 |
| 5,166,971 | 11/1992 | Vollert | 379/88.02 |
| 5,291,549 | 3/1994 | Izumi | 379/233 |
| 5,420,854 | 5/1995 | Hiraiwa | 370/359 |
| 5,555,294 | 9/1996 | Abe | 379/100.15 |
| 5,815,505 | 9/1998 | Mills | 370/522 |
| 5,818,819 | 10/1998 | Hallock et al. | 370/259 |

FOREIGN PATENT DOCUMENTS

6-125343  5/1994  Japan.

*Primary Examiner*—Chau Nguyen
*Assistant Examiner*—Eva Tang
*Attorney, Agent, or Firm*—Ostrolenk, Faber, Gerb & Soffen, LLP

[57] ABSTRACT

An ISDN communication apparatus of the present invention can accept termination of information when this information is received even when there is no idle B channel. The ISDN communication apparatus comprises at least one ISDN line interface (1) connected to the ISDN line, a multiplex link forming circuit (3) connected to a plurality of B channels to form a logical link through the multiplex conversion and a point R interface (2) connected to the logical link formed of the multiplex link forming circuit. When the D-ch interface (12) detects the distant party address from the termination information from the distant communication apparatus, the main control circuit (4) compares the distant party address with the previously set reference address to detect whether these are matched or not. When these addresses are matched, the switch circuit (31) releases at least one communication channel from a plurality of B channels in the busy condition and forms a new logical link between the released B channel and the point R interface of the responsive terminal.

13 Claims, 11 Drawing Sheets

ISDN COMMUNICATION APPARATUS

BACKGROUND OF THE INVENTION

1. Field of the Invention

The present invention relates to an ISDN communication apparatus which can receive data and signals of a plurality of terminals from an ISDN (Integrated Services Digital Network) line or transmits such data and signals to the ISDN line, and particularly to an ISDN communication apparatus which can transmit a call or receive a call from an originating subscriber even when all B channels are busy.

2. Description of the Prior Art

In the ISDN communication apparatus, setting of communication route for the distant subscriber is executed by a D channel for data communication through line exchange and data transmission has been executed in the transmission rate of 64 kbps using the B channels. When amount of the data is large, data communication has been performed using a plurality of B channels. In a basic ISDN communication, the B channels have B1 and B2 channels.

For example, the Japanese Patent Application Laid-Open No. HEI 6-125343 describes an ISDN communication apparatus having the function to execute communication by multiplexing data with line exchange and to compensate for time difference of data transmission between channels.

The ISDN communication apparatus of the related art is capable of executing only the bilateral communication with a distant communication apparatus using a plurality of B channels such as B1 and B2 channels. Therefore, when the B channels in the communication line, connected to a destination ISDN communication apparatus of a call terminating side, are busy, even if a distant ISDN communication apparatus of a calling side desires to make communication with the destination ISDN communication apparatus, it is impossible to perform the communication. Therefore, if the distant ISDN communication apparatus desires to make an emergency communication, the call from the distant ISDN communication apparatus is not accepted in the destination ISDN communication apparatus until any channel of the B channels becomes idle, and thereby the distant ISDN communication apparatus side cannot transmit important message. Moreover, the call terminating side will lose a very important communication chance.

In addition, when all B channels are busy in the calling side, any call cannot be originated. Accordingly, an operator in the calling side has been requested to be in the waiting condition until at least one channel becomes idle when the operator desires to make emergency data transmission or communication.

SUMMARY OF THE INVENTION

It is a first object of the present invention to provide an ISDN communication apparatus which can accept termination of information when it is received even if there is no B channel in the idle condition.

It is a second object of the present invention to provide an ISDN communication apparatus which can accept termination of message for setting a call even if there is no B channel in the idle condition when the address of distant party in the received message matches the reference address previously set or stored.

It is a third object of the present invention to provide an ISDN communication apparatus which can release the line by interchanging the communication line interface process while all B channels in the ISDN line are busy in order to originate a call to the external line while all channels are busy for effective use of the communication line.

In the ISDN communication apparatus of the present invention, an ISDN interface is connected to the ISDN line, and a communication interface connected to a plurality of communication terminals. A link forming circuit forms a logical link between a plurality of B channels from the ISDN interface and the communication interface. A detecting circuit detects an identification information included in a massage for setting a call received by the ISDN interface. The identification information identifies a distant communication apparatus transmitting the relevant message for setting call. A comparing circuit detects whether the identification information detected matches the preset reference information or not. A main control circuit controls the link forming circuit, responsive to the state that the identification information matches the preset reference information and there is no B channel of the idle condition, to release at least one channel among a plurality of B channels in the busy condition, and moreover controls the link forming circuit to form the logical link between the released channel and a particular communication terminal which is connected to the communication interface and is requested to make a communication by the distant communication apparatus.

As explained above, the present invention releases, when a call is terminated under the busy condition, only one communication channel among those under the busy condition to response to such termination of call, and thereby allows free communication with the distant communication apparatus which desires an emergency communication.

The main control circuit of the present invention may be provided with a judging circuit to judge whether at least one channel may be released or not from a plurality of B channels in the busy condition, when the identification information matches the preset reference information and there is no B channel in the idle condition. In this case, a link control circuit of the main control circuit controls the link forming circuit by a judging result of the judging circuit. With such control, the link forming circuit releases at least one channel from a plurality of B channels under the busy condition and forms a logical link between the released channel and the particular communication apparatus.

Therefore, since the B channel is released only when at least one of the B channels is permitted to be released, it can be prevented to release the B channel which is not permitted to be released.

With judgment that the channel is permitted to be released by the judging circuit, the link forming circuit releases the relevant channel after multiplexing the data of the channel to be released to the other B channel under the control of the link control circuit. Thereby, intermission of data communication at the time of releasing the channel can be prevented.

The link control circuit for controlling release of the B channel under the busy condition releases at least one channel from a plurality of B channels in the busy condition, calls the particular communication apparatus via the communication interface and controls the link forming circuit in response to such calling to form a logical link between the particular communication apparatus desired by the distant communication apparatus for making a communication and the released channel.

In the other ISDN communication apparatus of the present invention, with control of the link control circuit, the link forming circuit forms a logical link between the released channel and the particular communication apparatus and resets the logical link to reset to the initial communication condition before the release due to the termination of communication in the formed logical link.

The ISDN communication apparatus of the present invention also releases the B channel of the busy condition by a call to the ISDN line performed by the communication apparatus connected to the communication interface. The main control circuit controls the link forming circuit, responsive to a request for a call to the ISDN line from the communication apparatus under when all B channels are busy, in order to release at least one channel of a plurality of B channels in the busy condition for the purpose of establishing a call to the external line. Thereby, the call to external line when all channels are busy, can be realized for effective use of the communication line. In this case, the ISDN communication apparatus further comprises a memory circuit for storing the reference information and a comparing circuit for comparing identification information which identifies a communication apparatus requesting the call to the ISDN line with the reference information stored in the memory circuit, and detecting whether these data are matched or not. The control circuit controls the link forming circuit when the identification information matches the reference information to release at least one channel of a plurality of B channels in the busy condition for the purpose of establishing the call to the external line.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS (First Embodiment)

Figure 1:
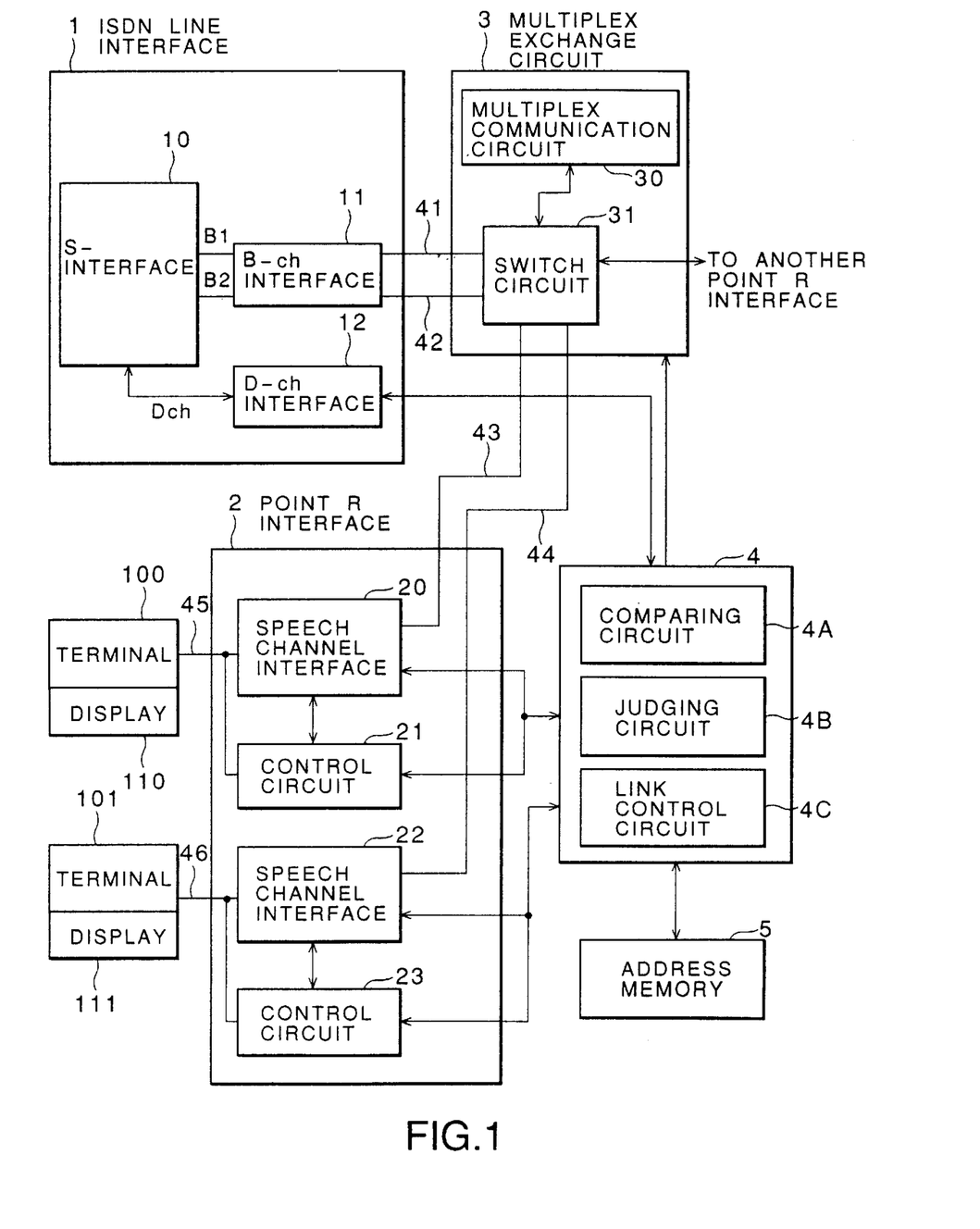
FIG. 1 is a perspective view showing a first embodiment of the ISDN multiplex communication apparatus of the present invention.

FIG. 1 is a block diagram showing a first embodiment of the ISDN communication apparatus of the present invention.

In this figure, the ISDN communication apparatus comprises an ISDN line interface 1 connected to the ISDN line L, a Point R interface 2 connecting a couple of terminals 100 and 101, a multiplex exchange circuit (multiplex link forming circuit) 3 to form a logical link by connecting the point R interface 2 or another point R interface (not illustrated) to the ISDN interface 1 with multiplex conversion, a main control circuit 4 for controlling the entire part, and an address memory 5. The address memory 5 is connected to the main control circuit 4 to store the address as the reference information. Here, the terminals 100, 101 are assumed as key (button) telephones. The point R interface may be a communication interface connected with a computer or another data communication apparatus. In this case, the computer or the data communication apparatus is used as each of the terminals 100, 101.

The ISDN line interface 1 is provided with an S interface 10 also provided in the existing ISDN interface, a B channel interface (hereinafter referred to as B-ch interface) 11 connected to the S interface 10 and a D channel interface (hereinafter referred to as D-ch interface) 12.

The S interface 10 receives ISDN data from the ISDN line L and separates it to the B1, B2, D channels, and then outputs the B1-channel and B2-channel data to the B-ch interface 11, while the D-channel data to the D-ch interface. Moreover, the S interface 10 also has a function to receive the B1-channel, B2-channel and the D-channel data from the B-ch interface 11 and D-ch interface 12 and then multiplexes these data to transmit the data to the ISDN line L.

The B-ch interface 11 adjusts the transmission rate of the B1-channel and B2-channel data and the timing for transmission and reception of data. The D-ch interface 12 has a call control function to control setting of the transmission route to a distant communication apparatus (not illustrated) connected to the ISDN line L and a function to terminate the call. In the call control mode, the D-ch interface 12 detects a call setting message for setting a call from the distant communication apparatus and also detects, from the call setting message, an address of the distant communication apparatus and a class of terminal (information indicating facsimile, key telephone or computer, etc.) requested by the distant communication apparatus. The address is, for example, a distant originating subscriber telephone number or a terminal number allocated to the distant communication apparatus. Since the address is allocated to every distant communication apparatus, it is identification information for identifying the distant communication apparatus.

A multiplex exchange circuit 3 has a switch circuit 31 for accommodating the point R interface 2 and a multiplex communication circuit 30. The switch circuit 31 connects a B1 channel line 41 and a B2 channel line 42 from the B-ch interface 11 to the point R interface 2 or the other point R interface. The point R interface 2 is connected with a communication line 43 corresponding to the terminal 100 and a communication line 44 corresponding to the terminal 101. The communication lines 43, 44 are accommodated within the switch circuit 31. Switching operation of the switch circuit 31 is controlled by the main control circuit 4.

The transmission rate of the data of the B1, B2 channels transmitted through the B1, B2 channel lines 41, 42 is 64 kbps and the transmission rate of the data of the communication lines 43, 44 from the point R interface 2 is set to 64 or 128 kbps.

The multiplex communication circuit 30 demultiplexes the data of 128 kbps received from the lines 43, 44 via the switch circuit 31 to convert the multiplexed data into the data of 64 kbps for the B1 or B2 channel line, and then outputs these data to the B1, B2 channel lines 41, 42 via the switch circuit 31. Moreover, the multiplex communication circuit 30 also multiplexes the data of B1 and B2 channel and outputs the multiplexed data to the point R interface 2 and other point R interface (not illustrated) via the switch circuit 31.

The point R interface 2 comprises speech channel interfaces 20, 22 connected to terminals 100, 101 and control circuits 21, 23 for disconnection of call originated, dial instruction and dial detection. The speech channel interfaces 20, 22 convert the communication data (voice data in FIG. 1) from the terminal 100 into the data of 128 kbps to output to the communication lines 43, 44. Moreover, these interfaces also execute transfer of inverse communication data. Input and output timings to or from communication lines 43, 44 of communication data are controlled by the main control circuit 4. The control circuits 21, 23 execute dial instruction and dial detection depending on the information from the terminals 100, 101. In addition, the control circuits 21, 23 also have the function to respectively output various control signals and display signals from the main control circuit 4 to the terminals 100, 101.

The main control circuit 4 comprises a comparing circuit 4A, a judging circuit 4B and a link control circuit 4C. The comparing circuit 4A compares the address (identification information) of the distant communication apparatus detected by the D-ch interface 12 with the reference address (reference information) stored in the address memory 5. The judging circuit 4B judges whether at least one channel among the B1, B2 channels used for communication is permitted to be released or not when the two addresses are matched and there is no B channel in the idle condition as a result of comparison. The link control circuit 4C controls the multiplex exchange circuit 3 to release the channel upon judgment for possibility of channel release to form a new logical link between the released channel and the point R interface 2.

The ISDN multiplex communication apparatus as the first embodiment of the present invention is characterized in that (i) while all speech channels of B channel are all busy, when the D-ch interface 12 has detected the call setting message from the ISDN line L, the D-ch interface 12 detects the address of the distant communication apparatus from the call setting message and then notifies it to the main control circuit 4;

(ii) the main control circuit 4 judges whether the detected address is equal to the reference address previously stored in the memory address 5 or not;

(iii) if the address matched (equal to) the reference address, the judging circuit 4B of the main control circuit 4 judges whether the B1 channel should be released or not;

(vi) when release is possible, the link control circuit 4C controls the multiplex exchange circuit 3 to release the B1 channel and moreover calls idle terminal 100 or 101 using the displays 110, 111 via the communication interface 2; and (v) the link control circuit 4C controls the switch circuit 31 to connect the released B1 channel line 41 and the communication line (43 or 44) connected to the terminal which responses the call.

The B1 channel is released by the call from the distant communication apparatus having the same address stored in the address memory 5. In this case, the distant communication apparatus has a higher communication priority.

Next, this operation will be explained in detail with reference to FIG. 1 and FIG. 2.

When a call is received from the second distant communication apparatus (not illustrated) under the condition (step S1) that data communication is being conducted with a first distant communication apparatus (not illustrated) using the B1, B2 channels, the call setting message from the second distant communication apparatus is detected by the D-ch interface 12 (step S2). The D-ch interface 12 detects the address of the second distant communication apparatus from the call setting message and notifies it to the main control circuit (step S3).

The comparing circuit 4A of the main control circuit 4 receives the address of second distant apparatus compares it with the reference address stored in the address memory 5 (step S4). If there is no address being matched (not identical), the comparing circuit 4A issues an instruction to end the call (step S11). When there is the reference address being matched with the received address, the judging circuit 4B of the main control circuit 4 judges whether the channel B1 is permitted to be released or not (step S5). In this case, the judging circuit 4B judges whether the first distant communication apparatus has the function of channel exchange not and can multiplex the data of B1 channel into the B2 channel or not. Information, indicating that the first distant communication apparatus has the channel exchange and multiplex functions, is stored in the main control apparatus 4 during the call setting sequence for the first distant communication apparatus. When the judging circuit 4 judges, depending on the stored contents, the first distant communication apparatus has the channel exchange and multiplex exchange, the main control circuit 4 outputs first the channel exchange instruction to the first distant communication apparatus using the D channel via the D-ch interface 12 and transmits this instruction to the first distant communication apparatus via the ISDN line L. When the first distant communication apparatus positively responds to this channel exchange instruction, the main control circuit 4 detects such response from the D-ch interface 12 and thereby the link control circuit 4C controls the multiplex exchange circuit 3. With this control, the multiplex exchange circuit 3 multiplexes the B1 channel data into the B channel data to prepare the release of the B1 channel line 41 (step S6). Namely, the multiplex communication circuit 30 multiplexes the B1 channel data into the B2 channel data to sent it to the B2 channel line 42, and then the switch circuit 31 releases, after the multiplexing, the B1 channel line 41. The B channel to be released may be the B2 channel.

In the step S5, when the judging circuit 4B judges the channel exchange and multiplexing are impossible, the call from the second distant communication apparatus is disabled and the call ends(step S12).

After the B1 channel is released, the link control circuit 4C of the main control circuit 4 judges a class of terminal for making the communication informed by the call setting message of D channel from the second distant communication apparatus. When a class of terminal judged is a key telephone, an idle key telephone (terminal 101 assumed in this case) is called via the origination control circuit of the point R interface 2 and the display data for displaying calling is transmitted to the display 111 of terminal 101 (step S7). Moreover, the link control circuit 4C transmits a calling message for the second distant communication apparatus to the D-ch interface 12 indicating that the desired terminal is being called.

When the idle terminal 101 responds to the call in the step S7 (step S8), such response is detected by the main control circuit 4 via the control circuit 23. Thereby, the link control circuit 4C controls the switch circuit 31 to connect the communication path between the communication line 44 and the B1 channel line 41 being released (step S9).

Thereby, the communication path of B1 channel is formed between the terminal 101 and the second distant communication apparatus to execute transmission and reception of data by the B1 channel (step S10). If the idle does not response to calling in the step S8, the call from the second distant communication apparatus is disabled and the call ends (step S13).

When the communication is to be completed, the main control circuit 4 sends the call termination message to the second distant communication apparatus via the D-ch interface 12 to end the communication by the B1 channel.

In the first embodiment, if the address of the second distant communication apparatus is identical to the reference address registered in the address memory 5, one channel of the B1, B2 channels already used for the communication with the first distant communication apparatus is released, and communication with a terminal can be realized using the released channel.

The address may be registered to the address memory 5 from the terminals 100, 101. In this case, the address registering condition is set with operations of particular buttons (keys) of the terminal, address input by the number keys is notified to the main control circuit 4 via the control circuit 23 and it is then stored in the address memory 5.

Figure 2:
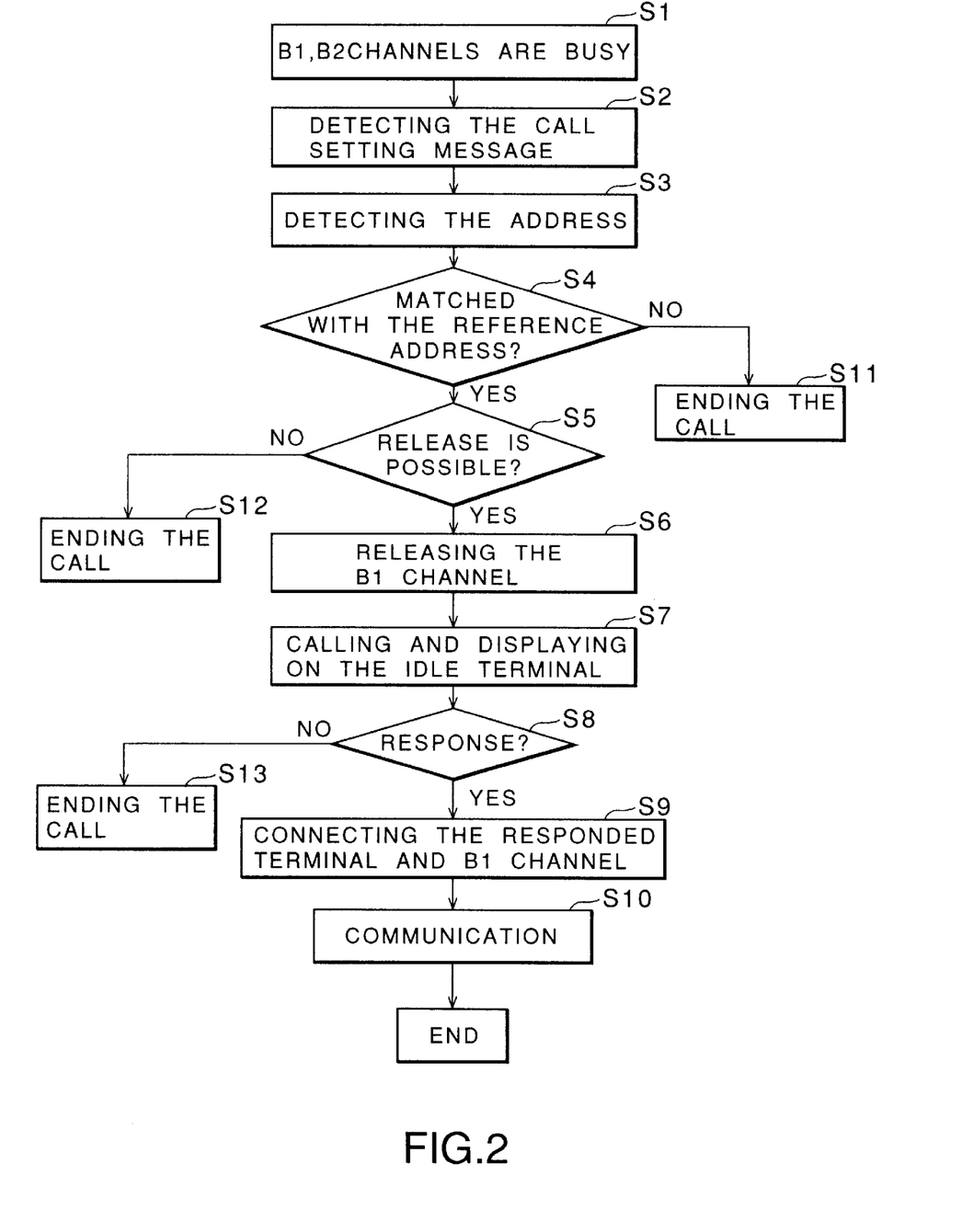
FIG. 2 is a flowchart showing operation of the ISDN multiplex communication apparatus of the present invention.

In the step S7 of the flowchart of FIG. 2, for indication on the display 11 of terminal 101, not only the calling is executed but also information relating to the second distant communication apparatus may be displayed. In FIG. 1, since the main control circuit 4 can detect the information (telephone number and code information) via the D-ch interface 12, such the information is transferred to the terminal 101 in step S7 for the purpose of display. Thereby, an operator of the terminal 100 or 101 can neglect the call from the second distant communication apparatus if it is unnecessary to response the call.

In the step S5 of the flowchart of FIG. 2, the judging circuit 4B of the main control circuit 4 judges whether release of the B1 channel is possible or not. Namely, whether the first distant communication apparatus making communication with the B1, B2 channels has the channel exchange and multiplexing function or not, is judged from the call setting message. However, it is also possible that the main control circuit 4 multiplexes the B1 channel data into the B2 channel data without such judgment to release the B1 channel.

Figure 3:
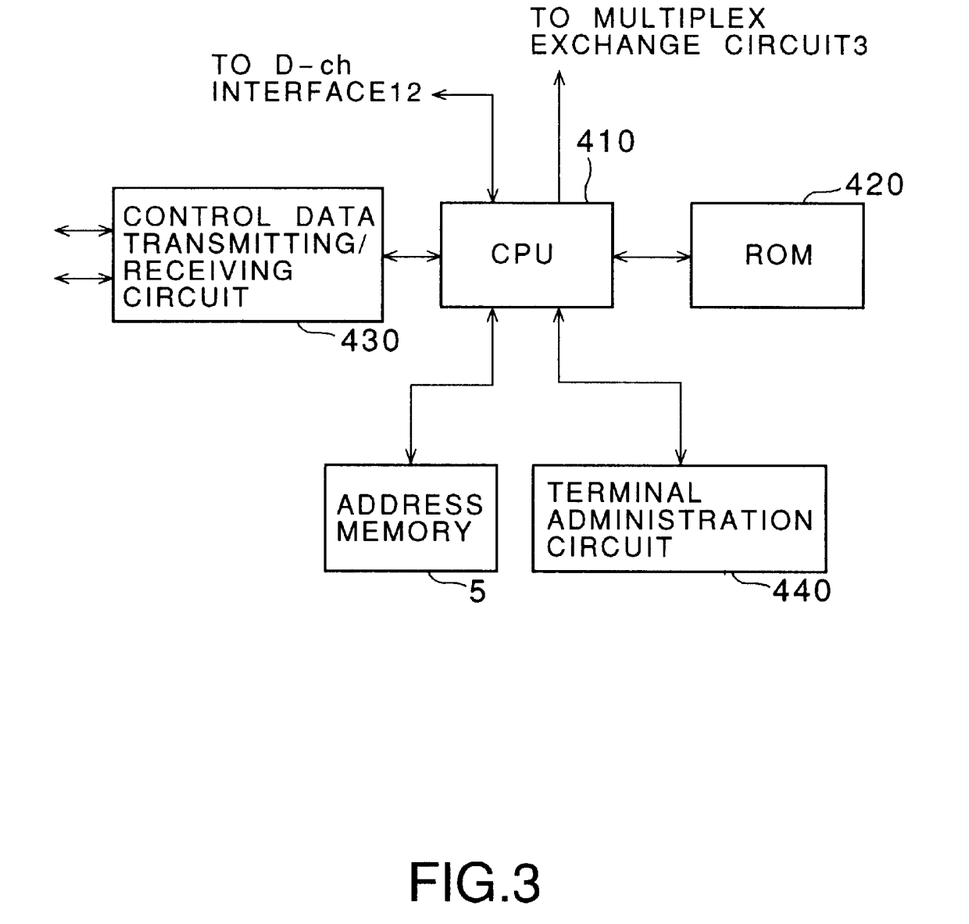
FIG. 3 is a circuit diagram showing a main control circuit of the ISDN multiplex communication apparatus of the present invention.

The main control circuit 4 of FIG. 1 is practically composed of a computer circuit using CPU. Therefore, the comparing circuit 4A, judging circuit 4B and link control circuit 4C of the main control circuit 4 of FIG. 1 are respectively structured by a programmable control circuit using CPU. FIG. 3 shows a detail circuit diagram of the main control circuit 4 formed of the programmable control circuit. The main control circuit 4 comprises a CPU 410, a ROM 420 for storing a control program to control the CPU 410, a control data transmitting/receiving circuit 430 connected to the point R interface 2 for transmitting and receiving the control signal to control the terminals 100, 101 and the control status signals from the terminals 100, 101, and a terminal administration means 440 for administrating conditions of each terminal based on the control data transmitted or received by the control data transmitting/ receiving circuit 430.

Upon receiving the address of the distant communication apparatus from the D-ch interface 12, the CPU 410 compares the received address with the reference address stored in the address memory 5 in the step S4 of FIG. 2. When these addresses are matched, the process shifts to the step S5. In this case, the channel exchange instruction is transmitted and the positive response to this instruction is received on the basis of the program stored in the ROM 420. The CPU 410 controls the multiplex exchange circuit 3 in the step S6 to multiplex the B1 channel data into the B2 channel data and release the B1 channel line 41. Next, the CPU 410 judges the class in the step S7 and thereafter refers to the terminal administration means 440. When there is an idle terminal, the CPU 410 calls all terminals of the idle condition in the step S7. This calling is executed via the control data transmitting/receiving circuit 430. The subsequent processes (step S8, S9, S10, S13) are all performed on the basis of the control of CPU 410.

According to the first embodiment of the present invention, since the address of important distant communication apparatus is previously stored in the address memory 5, even if all B channels are busy, the communication channel is formed in response to the calling from the distant communication apparatus having this address (second distant communication apparatus). For example, when a data terminal of a distant calling party is executing the data communication with the ISDN communication apparatus through the B1 and B2 channels, a telephone terminal of the same distant calling party detects, whose address is stored in the address memory 5, can execute via the B1 channel the telephone communication to enable communication with the terminal 101 after releasing the B1 channel. Namely, when the distant calling party is making communication with the ISDN communication apparatus of FIG. 1 with only one terminal, the distant party can continuously commence another communication with another terminal even when all lines (all B channels) are busy.

Moreover, since the data communicated through the B channel to be released is multiplexed to the other B channel by the multiplex communication circuit 30, intermission of data communication can be prevented by the release of channel.

Moreover, since information of a distant party who desires call setting is displayed under the control of the main control circuit 4 on the display of an idle terminal after the release of B channel, a terminal operator can send a response after confirming the distant party.

(Second embodiment)

Figure 4:
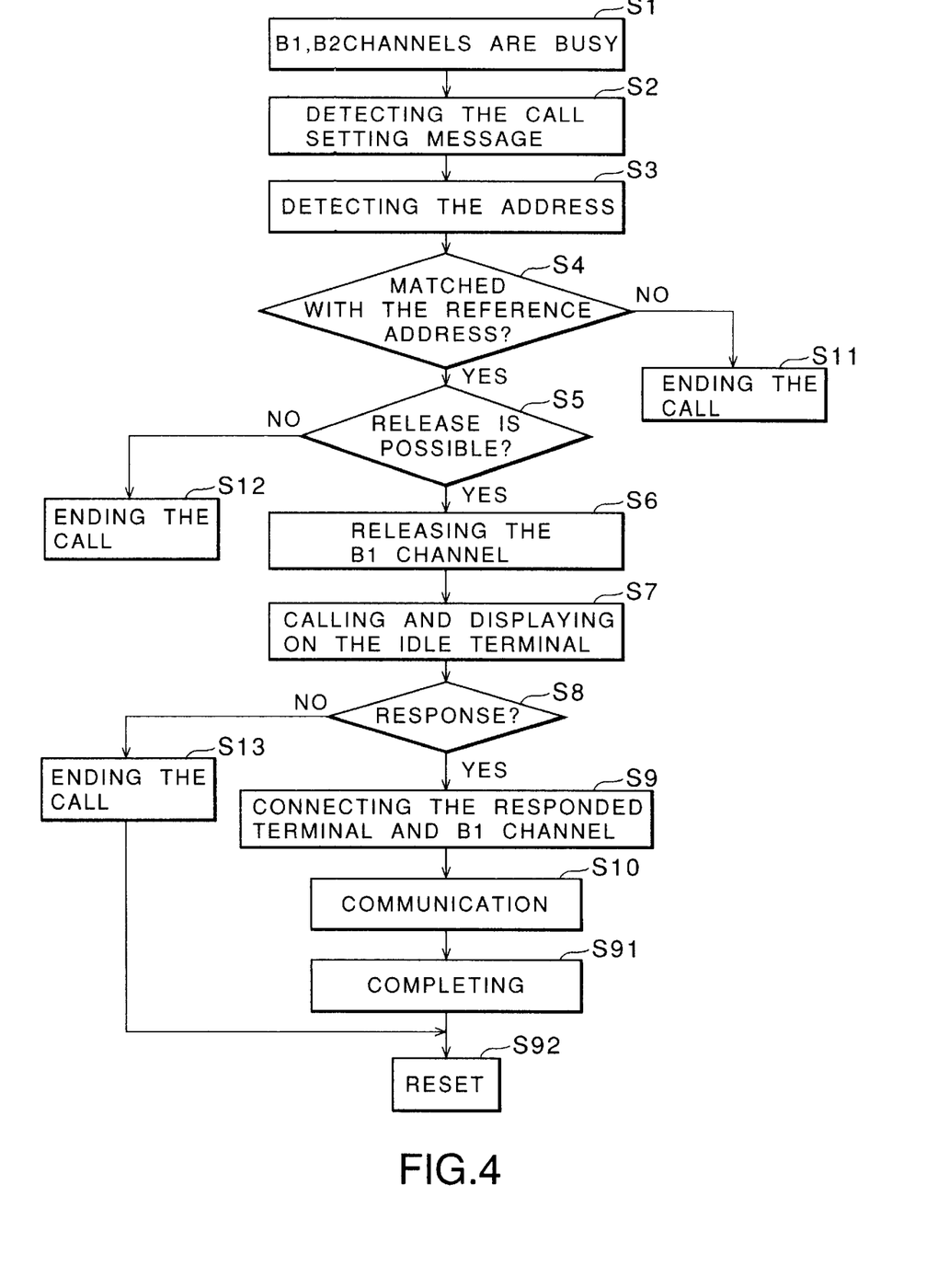
FIG. 4 is a flowchart showing operation of a second embodiment of the present invention.

FIG. 4 is an operation flowchart of the ISDN communication apparatus of the second embodiment of the present invention. The ISDN communication apparatus of the second embodiment has the same structure as FIG. 1 and the step S1 to Step S10 are the same as those of FIG. 2 in regard to the process of the main control circuit 4. However, in this embodiment, after communication is completed in the B1 channel (step S91) and after the step S13, condition is reset to the communicating condition of step S1 (step S92).

This reset is executed under the control of the main control circuit 4 of FIG. 1. In the step S92, the link control circuit 4C of the main control circuit 4 generates a reset instruction for instructing the reset and transmits this instruction with the D channel to the first communication apparatus via the D-ch interface 12. The first distant communication apparatus transmits the response signal to the reset instruction. When this response is received by the D-ch interface 12, the main control circuit 4 controls the multiplex communication circuit 30 to reset the B channel. Thereby, the B1 channel data, which has been transmitted in the B2 channel through multiplexing, is separated and is then transmitted using the B1 channel line 41.

(Third embodiment)

Figure 5:
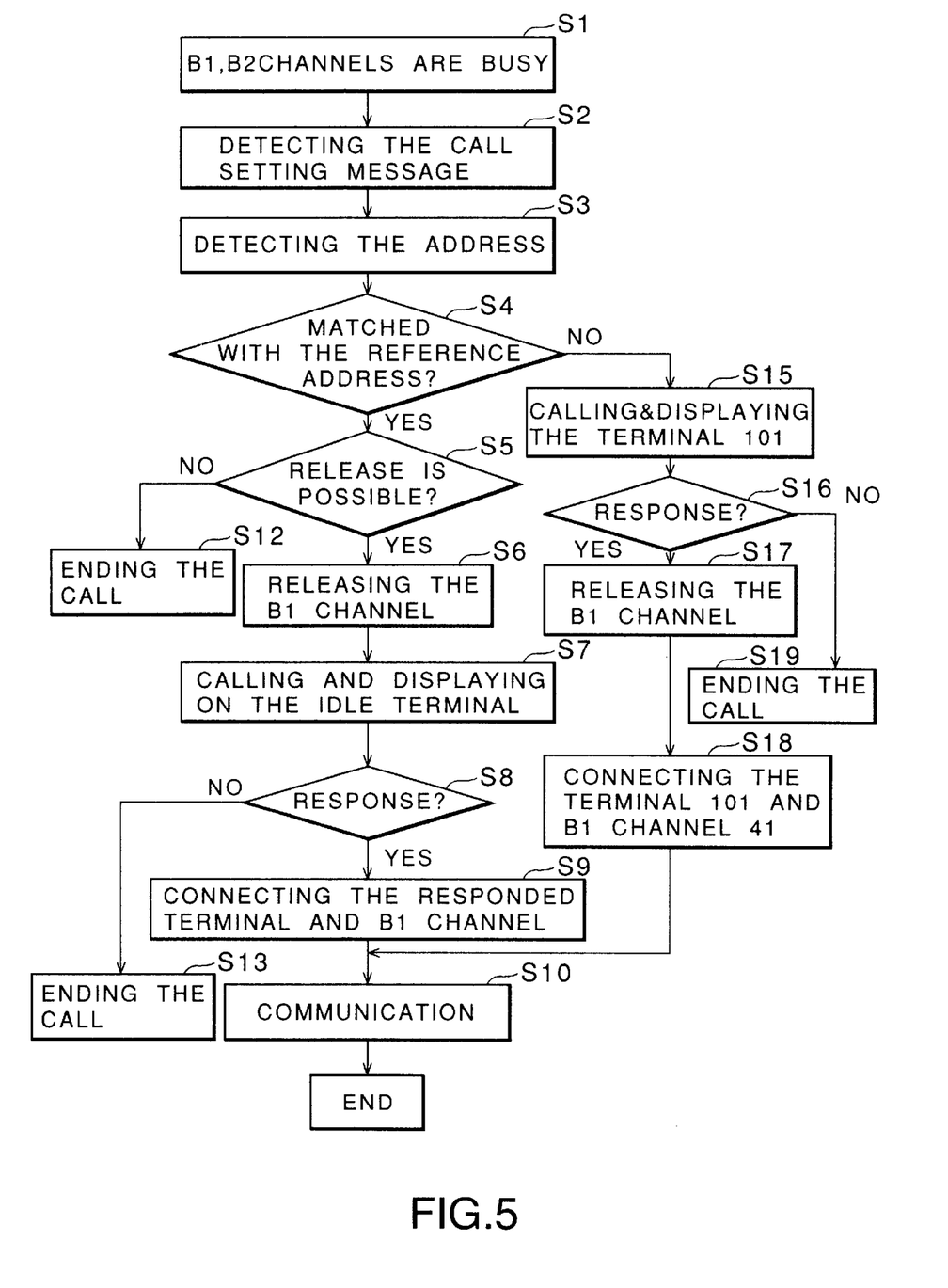
FIG. 5 is a flowchart showing operation of a third embodiment of the present invention.

FIG. 5 is an operation flowchart of the ISDN communication apparatus of the third embodiment of the present invention. The ISDN communication apparatus of the third embodiment has the same structure as FIG. 1 but is different in operation for the judgment NO of the step S4 of FIG. 2.

In FIG. 1 and FIG. 5, the comparing circuit 4A of the main control circuit 4 compares, in the step S4, the address of the second distant communication apparatus of the distant calling party with the reference address stored in the address memory 5. When it is judged that the address does not matches with the reference address, the link control circuit 4C of the main control circuit 4 calls the terminal 101 to display the information about the second distant communication apparatus (step S15). When the terminal 101 sends a response (step S16), the link control circuit 4C detects this response, releases the B1 channel line 41 (step S17) and establishes the communication path between the terminal 101 and B1 channel line 41 (step S18). When the terminal does not sends a response, the line is disconnected (step S19).

In the third embodiment, even if the address from the distant calling party is not stored in the address memory 5, the operation for releasing the B channel can be continued.

(Fourth embodiment)

Figure 6:
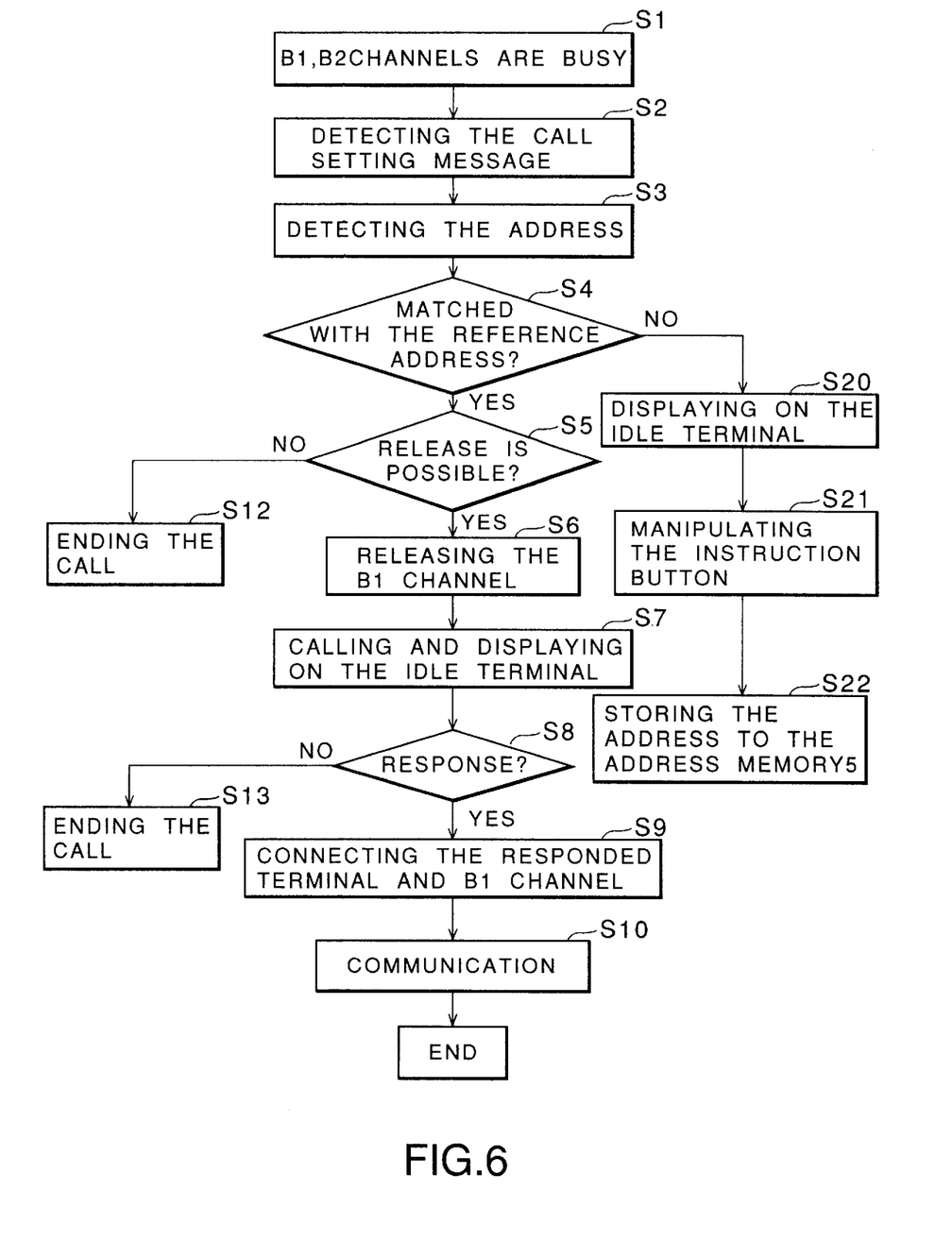
FIG. 6 is a flowchart showing operation of a fourth embodiment of the present invention.

FIG. 6 is an operation flowchart of the ISDN communication apparatus of the fourth embodiment of the present invention. The ISDN communication apparatus of the fourth embodiment has the same structure as FIG. 1 and only the process required for the negative judgment NO in the step S4 of FIG. 2 is different.

In FIG. 1 and FIG. 6, when the comparing circuit 4A of the main control circuit 4 compares, in the step S4, the address of the second distant communication apparatus of the distant calling party with the reference address stored in the address memory 5, and the two addresses are not matched with each other, the link control circuit 4C of the main control circuit 4 sends, via the point R interface 2, the display information about the second distant communication apparatus, for example, the display information for displaying the address to the display 111 of the idle terminal 101 (step S20). When a terminal operator watching this display manipulates an instruction button of the terminal 101 (step S21), this manipulation information is transmitted to the main control circuit 4 from the control circuits 21, 23 of the point R interface 2. Responsive to the information, main control circuit 4 stores the address of the second distant communication apparatus notified from the D-ch interface 12 into the address memory 5.

According to the fourth embodiment, when a call is received from the distant communication apparatus, if the address included in the call setting message (information for setting the call) does not match with the reference address stored previously, the address is stored in the address memory 5 as the reference address. Therefore, the address to be stored can be increased for every termination of call.

In the first to fourth embodiments explained above, the D-ch interface 12 of FIG. 1 detects the call setting message as the termination message from the ISDN line in order to detect the address of the distant communication apparatus. The present invention is not limited thereto. Namely, the address may be detected from the sub-address of calling message or from the user information, if it is possible.

Moreover, it is also possible to release the B1 channel line 41 after matching of the address is detected only when a kind of data transmitted from the distant communication apparatus is identified in the communication of layers 2, 3 of the ISDN communication and only the particular kind of data (for example, 3.1 audio) is communicated. In this case, the D-ch interface 12 identifies the kind of data from the terminated message. The main control circuit 4 detects, when the identified data is the particular kind of data, matching between the address of the distant communication apparatus notified from the D-ch interface 12 and the reference address of the address memory 5. When these addresses are matched, the main control circuit 4 executes the processes specified in the step S5 to the step S10 of FIG. 2.

As described above, when the ISDN communication apparatus of FIG. 1 has received the termination message under the condition that all B channels are busy, new communication between the apparatus of FIG. 1 and the distant communication apparatus can be executed.

(Fifth embodiment)

Figure 7:
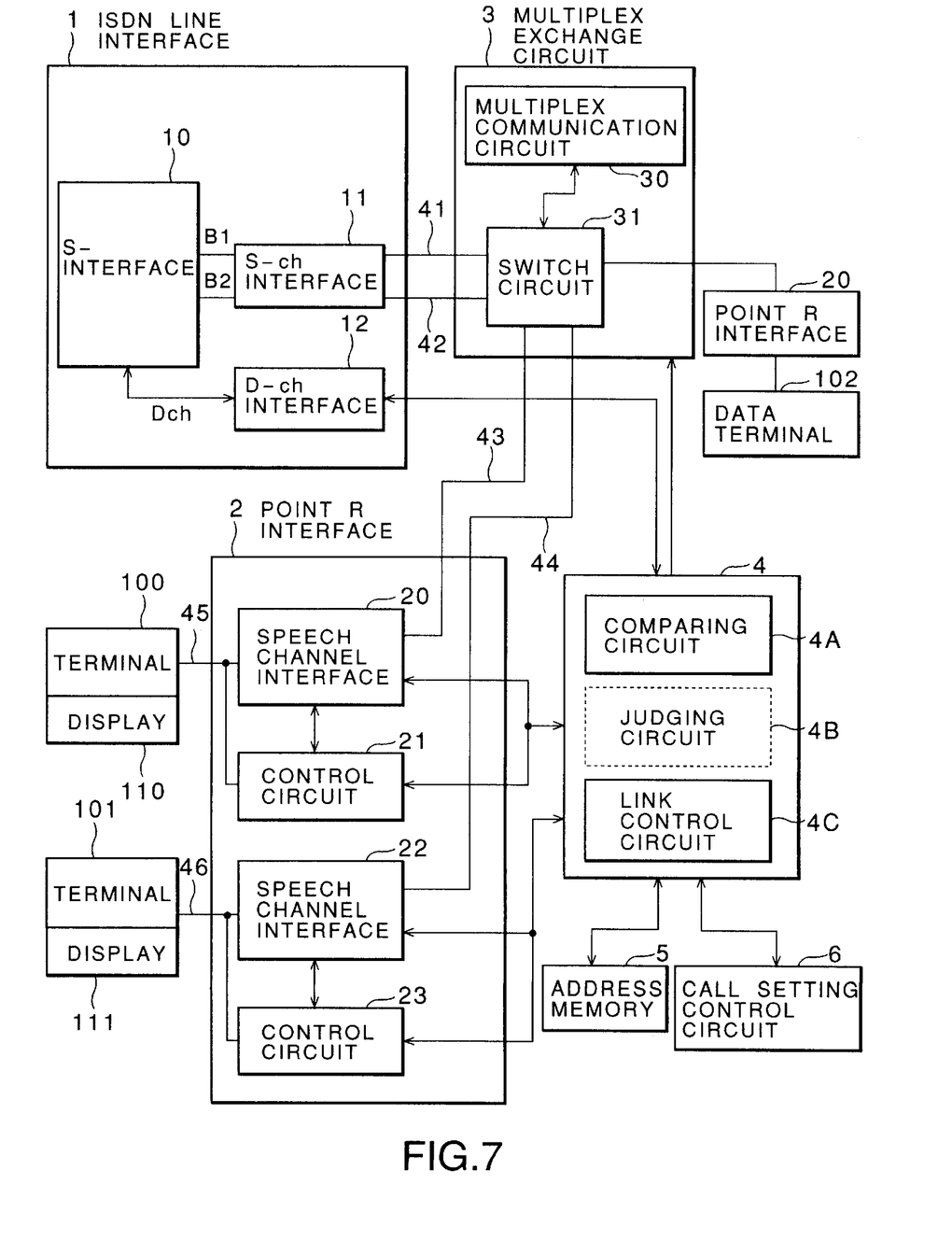
FIG. 7 is a perspective view showing a fifth embodiment of the ISDN multiplex communication apparatus of the present invention.

FIG. 7 is a block diagram showing the ISDN communication apparatus of the fifth embodiment of the present invention. The ISDN communication apparatus of FIG. 7 is different from the ISDN apparatus of FIG. 1 in the operation of the main control circuit 4, provision of the call setting control circuit 6 and that the data terminal 102 is connected via the point R interface 20, but the other portions are the same as the ISDN communication apparatus of FIG. 1. The ISDN communication apparatus of FIG. 7 is capable of executing the communication when an origination of call from each of the terminals 100, 102 is detected under the condition that all B channels are busy.

Figure 8:
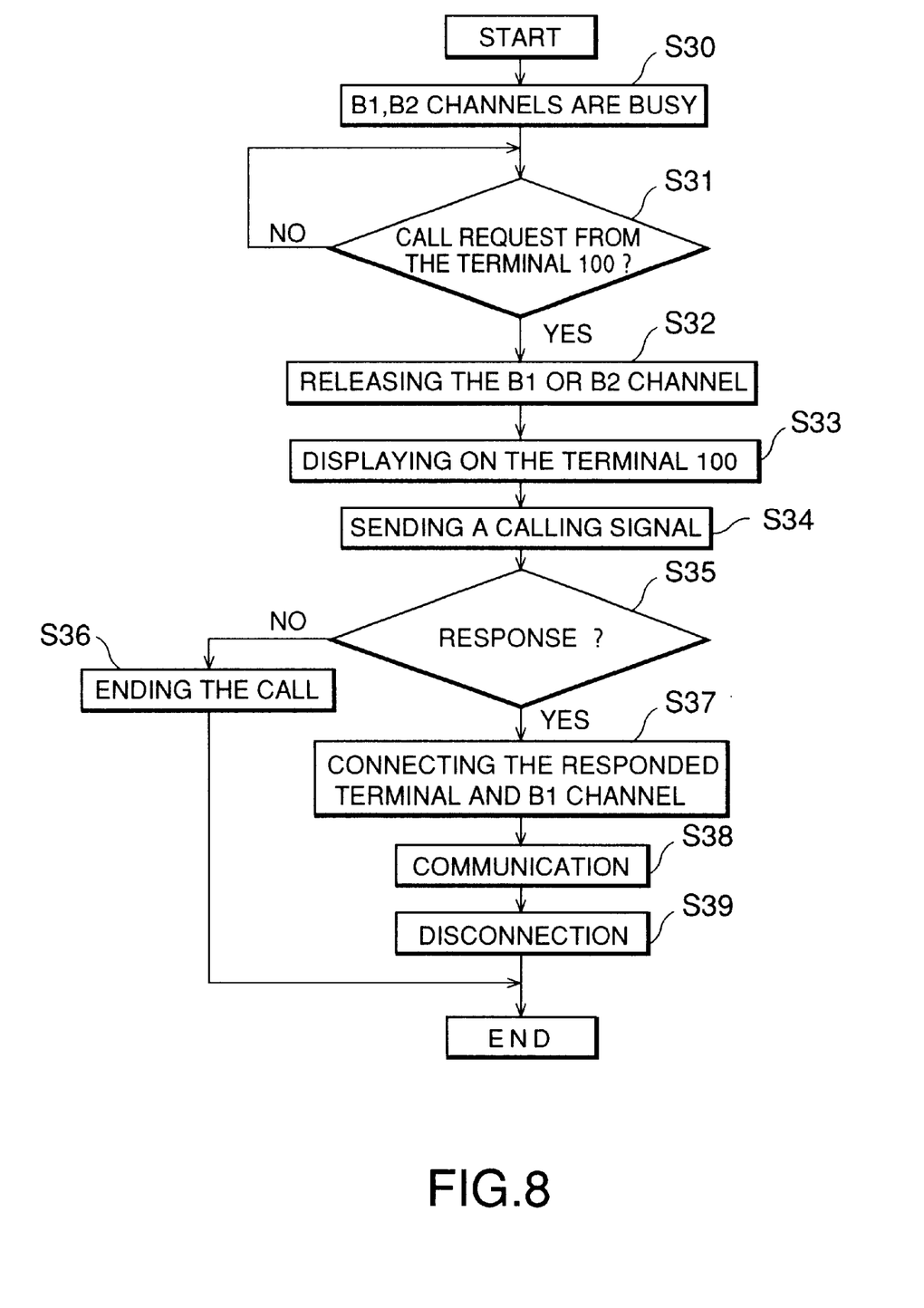
FIG. 8 is a flowchart showing operation of the fifth embodiment of the present invention.

FIG. 8 is the operation flowchart of the ISDN communication apparatus of the fifth embodiment of FIG. 7. In FIG. 7 and FIG. 8, the first distant communication apparatus (not illustrated) connected through the ISDN line L is making communication with the data terminal 102 through all lines (B1, B2 channels are busy) (step S30). When the call generated from one (terminal 100) of the terminals 100, 101 is detected by the main control circuit 4, a call request including a telephone number of the terminal 100 is stored in the call setting control circuit 6 (step S31). Responsive to the call request, the main control circuit 4 controls the switch circuit 31 to release the B1 channel 41 or B2 channel 42 even if it is busy or idle (step S32).

After releasing the B1 channel, the main control circuit 4 outputs a display signal to the terminal 100 via the point R interface 2 to indicate that the connection is possible on the display 110 (step S33).

Depending on the call request from the terminal 100 which is set to the call setting control circuit 6, the main control circuit 4 controls the D-ch interface 12 to send a calling signal (a calling telephone number) to a exchange office of an ISDN network via the S interface 10 and the ISDN line L (step S34). When there is no answer from the ISDN line L to the D-ch interface 12 (step S35: NO), the main control circuit 4 controls the line to disconnect, disabling termination of call (step S36).

After the main control circuit 4 receives (YES) the response signal from the D-ch interface 12 in the step S35, it sends a call setting message, having the telephone number (address) of the terminal 100 stored in the call setting control circuit 6, via the D-ch interface 12 and the ISDN line L to the second distant communication apparatus (step S37). The distant party (second distant communication apparatus) responds to this transmission using the D channel to close the speech channel for the communication (step S38). The speech channel is established when the main control circuit 4 controls the switch circuit 30 to connect the terminal 100 and released B channel in step S38. When the main control circuit 4 detects the end message via the D-ch interface 12 for completion of communication, the line is disconnected to complete the communication (step S39).

As explained above, even if the line is busy in the ISDN network, the B1 or B2 channel is released without relation to use, the communication caused by the call from the terminal 100 can be realized under the condition that all lines are busy.

(Six embodiment)

Figure 9:
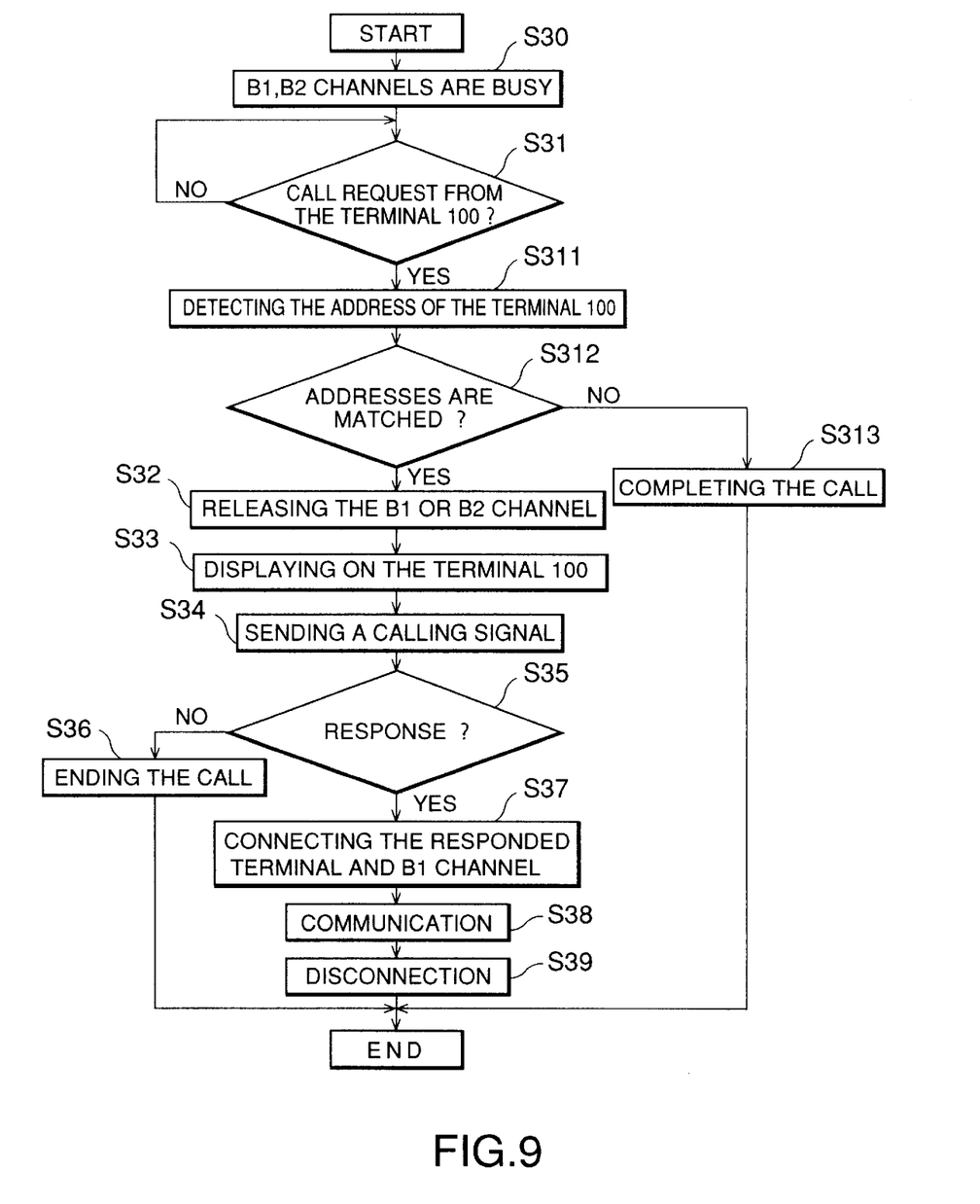
FIG. 9 is a flowchart showing operation of a sixth embodiment of the present invention.

FIG. 9 is a flowchart showing the processing sequence in the operation of the sixth embodiment of the present invention. Structure of the ISDN communication apparatus of the sixth embodiment is the same as that of FIG. 7.

In FIG. 7 and FIG. 9, the first distant communication apparatus (not illustrated) connected via the ISDN line L is making a communication with the data terminal 102 through all lines (B1, B2 channels) (step S30). When the call generated from the terminal 100 is detected by the main control circuit 4, the call request including the calling telephone number is then stored in the call setting control circuit 6 (step S31).

Then, the main control circuit 4 detects an address ( the calling telephone number) of the terminal 100 from the call setting control circuit 6 (step S311). The main control circuit 4 compares the address with the reference address (telephone number) stored previously in the address memory 5 (step S312). This comparison is carried out by the comparing circuit 4A. If matching is not detected (NO), the main control circuit 4 completes the call. (step S313).

When the address detected in the step S312 matches the reference address previously stored in the address memory 5 (YES), the link control circuit 4B of the main control circuit 4 controls the switch circuit 31 to release the B1 channel 41 or B2 channel 42 without relation of use thereof (step S32). Subsequent operations from the step S33 to the step S39 are the same as those shown in the flowchart of FIG. 8.

The address stored in the address memory 5 is previously registered by manipulations from the terminal 100 or 101. In this registration, the special number key is operated at the terminal 100 or 101 to set the main control circuit 4 to an address registration mode. In the address registration mode, the input address, for example, the telephone number is transmitted to the main control circuit 4 through the control circuits 21, 23 and is then stored in the address memory 5.

As explained above, in the sixth embodiment, the address included in the call request from the terminal 100 is judged by referring to the address memory, and one of the B1 channel and B2 channel in the busy condition is released, enabling establishing the communication between the terminal 100 and the called distant communication apparatus even when all lines are busy.

(Seventh embodiment)

Figure 10:
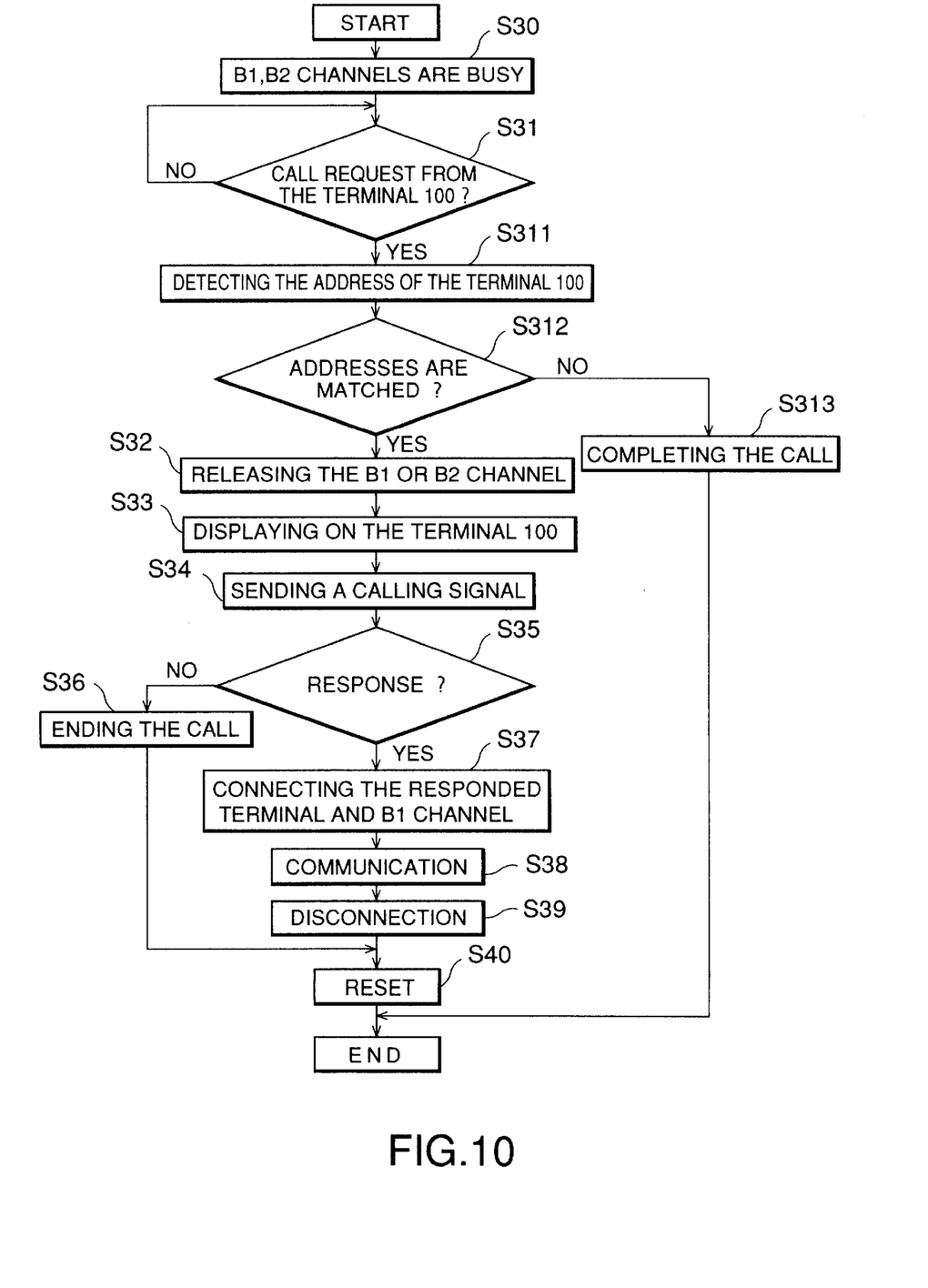
FIG. 10 is a flowchart showing operation of a seventh embodiment of the present invention.

FIG. 10 is the flowchart showing the processing procedures of the operations of the seventh embodiment of the present invention. Structure of the ISDN communication apparatus of the seventh embodiment is the same as that shown in FIG. 7. Moreover, the processes of the main control circuit 4 is the same as that of steps S30 to S39. However, in this embodiment, after the communication of the B channel released depending on the call request from the terminal 100 is completed (step S39), the condition is reset to the communication condition of the step S30 (Step S40). At the step S35, if any response is not issued from the (second) distant communication apparatus, then the call ends (step S36), and then the condition is reset to the communication condition of the step S30 (Step S40).

This reset is executed under the control of the main control circuit 4 of FIG. 7. In the step S40, the link control circuit 4C of the main control circuit 4 generates a reset instruction for instructing reset and sends this instruction to the first distant communication apparatus via the D-ch interface 12. The first distant communication apparatus is the distant party making communication by means of the B1 and B2 channels in the step S30. The first distant communication apparatus sends the response signal responsive to the reset instruction, and when this response signal is received by the D-ch interface 12, the main control circuit 4 controls the multiplex communication circuit 30 and resets to the communication using the B1 and B2 channels between the first distant communication apparatus and the terminal 103.

As explained above, in the seventh embodiment, the terminal 100 requires emergency call, the B1 or B2 channel in the ISDN is released to establish the communication between the terminal 100 and the called distant communication apparatus even if all of the B channels are used. Moreover, the communication is reset to a previous mode in step S30.

(Eighth embodiment)

Figure 11:
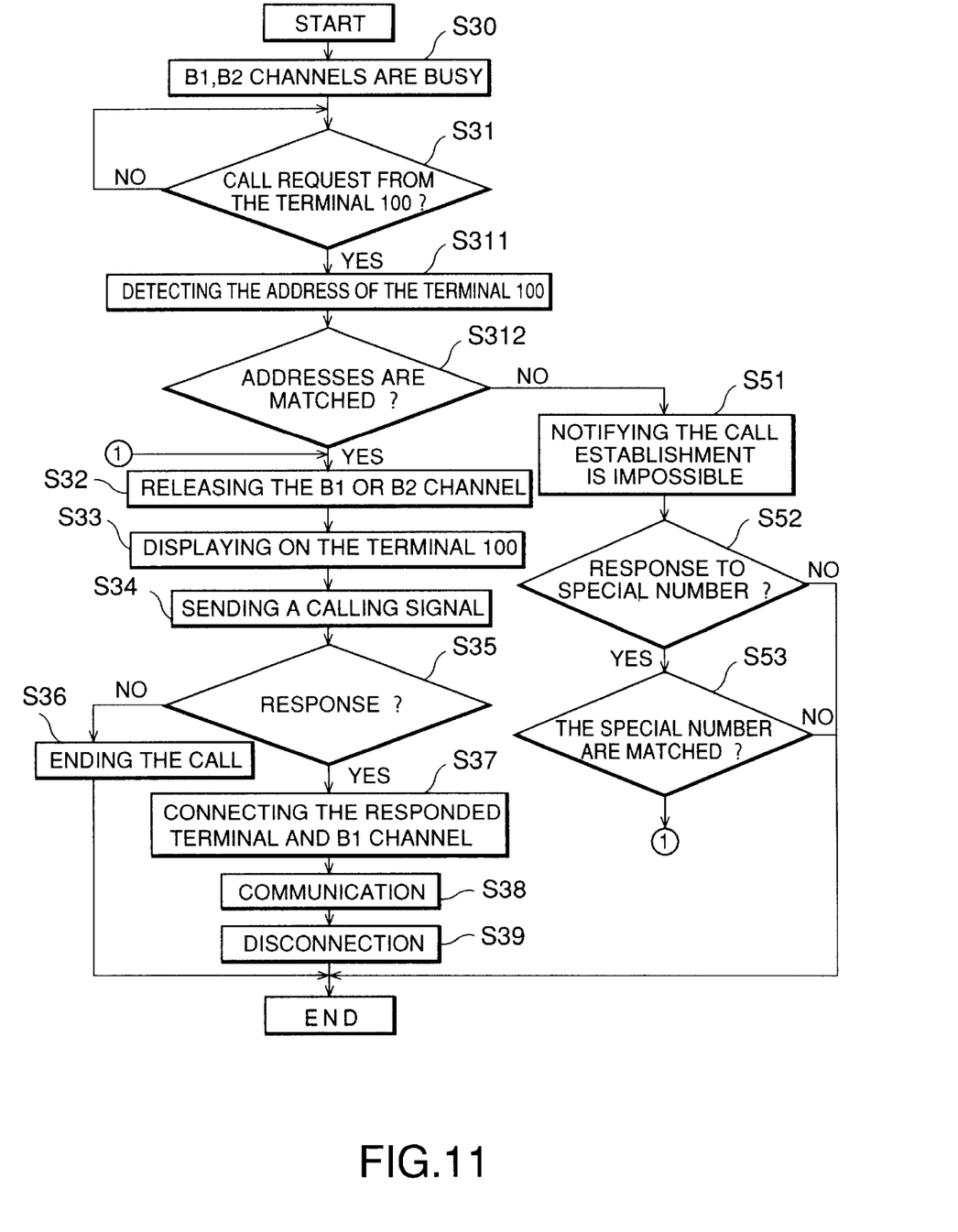
FIG. 11 is a flowchart showing operation of an eighth embodiment of the present invention.

FIG. 11 is the flowchart showing the processing procedures of the operations of the eighth embodiment of the present invention. Structure of the ISDN communication apparatus in the eighth embodiment is the same as that of FIG. 7. Moreover, processes of the main control circuit are also the same as those from the step S30 to S39. However, the process in such a case that the address from the terminal 100 does not match the address previously stored in the address memory 5 in the step S312 is different from the process of FIG. 9.

If the comparing circuit 4A of the main control circuit 4 detects mismatching between the address from the terminal 100 and the address stored previously in the address memory 5 (step S312: NO), the main control circuit 4 notifies that the call establishment is impossible because the address does not match the address stored to the terminal 100. (step S51). Next, the main control circuit 4 judges whether the specified special number is input from the terminal 100 or not (step S52).

This special number is a common encryption for a plurality of users. If the special number is not input for the specified period of time (step S52: NO), the process is completed. While the special number is input, the main control circuit 4 judges whether such special number matches the predetermined special number (step S53).

When these special numbers match in the step S53 (YES), the B1 or B2 channel is released in the step S32 and communication is continued with the channel released by execution of the subsequent processes.

As explained above, in the eighth embodiment, if the call request and the special number is generated at the terminal 100, one of the B1 or B2 channel in the busy condition is released even if the address of the terminal 100 is not stored in the address memory 5.

It is also possible in this eighth embodiment that the B1 or B2 channel which has been once released depending on the call request is reset after the end of the communication as in the case of the seventh embodiment.

In the fifth to eighth embodiments of FIG. 8 to FIG. 11, the B channel is forcibly released in the step S32. However, the process of the step S5 shown in FIG. 2 may be executed before the step S32. In this case, the main control circuit 4 of the ISDN communication apparatus of FIG. 7 requires a judging circuit having the same function as that of the judging circuit 4B provided in the main control circuit 4 of FIG. 1. The judging circuit 4B indicated by a broken line in FIG. 7 judges whether the first distant communication apparatus has the channel exchange and multiplex function to send the B1 channel data after it is multiplexed to the B2 channel data. The information about that the first distant communication apparatus using the B1 and B2 channels has the channel exchange and multiplex function is stored in the main control apparatus 4 in the call setting sequence in the communication between the first distant communication apparatus and terminal 103.

When the judging circuit 4B judges, depending on the stored contents, that the degeneration function is provided, the main control circuit 4 outputs first the channel exchange instruction to the first distant communication apparatus with the D-channel via the D-ch interface 12 to send it to the distant communication apparatus via the ISDN line L. When the first distant communication apparatus issues a positive response to such channel exchange instruction, the main control circuit 4 detects this response from the D-ch interface 12 and thereby the link control circuit 4C controls the multiplex exchange circuit 3. With such control, the multiplex exchange circuit 3 multiplexes the B1 channel data into the B2 channel data and then releases the B1 channel line 41. In this case, the multiplex communication circuit 30 multiplexes the B1 channel data into the B3 channel data to send this B2 channel data to the B2 channel line 42. After this multiplexing, the switch circuit 31 releases the B1 channel line 41. The B channel to be released may be the B2 channel. (Modification Example of Embodiments)

The present invention is not limited only to above embodiments. For example, the B channel has been classified into the B1 and B2 channels, but multiplexing is also possible when a large number of channels are used. In this case, the B channel released in the step S6 from FIG. 2 to FIG. 6 and in the step S32 from FIG. 8 to FIG. 11 is not limited to one and two or more B channels can be released.

The terminals 100, 101 of the ISDN communication apparatus of FIG. 1 and FIG. 7 may also be selected from the voice terminal such as key telephone and PHS terminal, facsimile terminal and personal computer. In the case of connecting a data terminal such as the personal computer to the point R interface, the structure of the point R interface is different from that of FIG. 1 and FIG. 7. Namely, the data interface such as RS232C interface or the like is used in place of the speech channel interfaces 20, 22 and origination control circuits 21, 23.

The display fixed to each terminal of the ISDN communication apparatus of FIG. 1 and FIG. 7 may be independent of the terminal. Moreover, the ISDN line L and point R interface 2 are connected through the line by way of the multiplex exchange circuit 3, the present invention is not limited to this line exchange and also permits the connection by means of the packet multiplex exchange connection and the other logical multiplex communication.

In place of the point R interface 2, the other ISDN line interface may be connected. The ISDN line L is not limited to the line of basic rate and may also be the primary rate line or B-ISDN line.

What is claimed is:

1. An ISDN communication apparatus comprising:
   an ISDN interface connected to an ISDN line;
   a communication interface connected to a plurality of communication terminals;
   a link forming circuit to form a logical link for the communication between a plurality of B channels from said ISDN interface and said communication interface;
   first detecting means for detecting from the D channel supplied from said ISDN interface, an identification information which identifies a distant communication apparatus transmitting a message for setting a call;
   second detecting means for detecting whether said identification information matches the previously set reference information or not; and
   control means for controlling, responsive to a judgment by said second detecting means that said identification information matches said reference information and a judgement that there is no idle B channel, said link forming circuit to release at least one channel from said plurality of B channels in the busy condition and to form the logical link between the released channel and a particular communication terminal among said communication terminals to be desired by said distant communication apparatus for making a communication.

2. The ISDN communication apparatus as set forth in claim 1, said control means comprising:
   judging means for judging whether at least one channel is permitted to be released from said plurality of B channels in busy condition; and
   link control means for controlling said link forming circuit to release at least one channel from said plurality of B channels in the busy condition responsive to a judgement by said judging means, and forming the logical link between the released channel and said particular communication apparatus.

3. The ISDN communication apparatus as set forth in claim 2, wherein said link forming means releases, when the release of at least one channel from said plurality of B channels is permitted, said one of the B channels after multiplexing data of the channel to be released into data of another B channel under the control of said link control means.

4. The ISDN communication apparatus as set forth in claim 1, said control means comprising:
   judging means for judging, responsive to the judgment that said identification information matches the reference information and the judgement that there is no idle B channel, whether at least one channel from said plurality of B channels in the busy condition is permitted to be released or not; and
   link control means for controlling said link forming circuit, responsive to a judgment by said judging means, to release at least one channel from said plurality of B channels in busy condition, and for calling said particular communication terminal via said communication interface and for forming a logical link between said particular communication terminal and the released channel on the basis of a response from said particular communication terminal.

5. The ISDN communication apparatus as set forth in claim 4, wherein said control means calls the communication terminal in an idle condition responsive to said message for setting the call, said message including a type of the communication terminal.

6. The ISDN communication apparatus as set forth in claim 1, said control means comprising;
   judging means for judging, responsive to the judgment that said identification information matches the reference information and the judgement that there is no idle B channel, whether at least one channel from said plurality of B channels in the busy condition is permitted to be released or not; and
   link control means for controlling said link forming circuit, responsive to a judgment by said judging means, to release at least one channel from said plurality of B channels in the busy condition, to form a logical link between the released channel and said particular communication terminal, and to reset to original communication condition before releasing the channel.

7. The ISDN communication apparatus as set forth in claim 4, wherein said link control means calls said particular communication apparatus via said communication interface responsive to the judgment by said judging means that said identification information does not match the reference information and the judgement that there is no idle B channel, and said link control means controls said link forming circuit to release at least one channel from said plurality of B channels in the busy condition on the basis of a response to said calling and to form the logical link between said released channel and said particular communication apparatus.

8. The ISDN communication apparatus as set forth in claim 1, further comprising means for identifying a type of data from said message for setting the call, and said control means controls said link forming circuit, responsive to a detection whether the type of the data is a particular type and a detection of matching between said identification information and said reference information, to release only one channel from said plurality of B channels in the busy condition.

9. An ISDN communication apparatus, comprising:
an ISDN interface connected to the ISDN line;
a communication interface connected to a plurality of communication terminals;
a link forming circuit for forming a logical link for communication between a plurality of B channels from said ISDN interface and said communication interface;
reference information storing means for storing reference information;
first detecting means for detecting from the D channel supplied from said ISDN interface, an identification information which identifies a distant communication apparatus transmitting a message for setting a call;
second detecting means for comparing said identification information with said reference information read from said reference information storing means to detect whether these are matched or not; and
control means for controlling, responsive to a judgment by said second detecting means that said identification information matches said reference information and a judgement that there is no idle B channel, said link forming circuit to release at least one channel from said plurality of B channels in the busy condition, to form the logical link between the released channel and a particular communication terminal among said communication terminals to be desired by said distant communication apparatus for making a communication, and to store said identification information in said storing means as said reference information on the basis of a predetermined instruction generating when said identification information does no match said reference information.

10. A ISDN multiplex communication apparatus, comprising:
an ISDN interface connected to the ISDN line;
a communication interface connected to communication terminals;
a link forming circuit to form a logical link for the communication between a plurality of B channels from said ISDN interface and said communication interface; and
a control circuit for controlling said link forming circuit to release at least one channel among said plurality of B channels in the busy condition to establish a call from one of said communication terminals by receiving a call request from said communication terminal while all B channels are busy.

11. The ISDN communication apparatus as set forth in claim 10, further comprising storing means for storing reference information and comparing means for comparing identification information, which identifies said communication terminal requesting the call and is received from said communication terminal, with the reference information stored in said storing means to detect whether these are matched or not,
said control circuit controlling, upon matching between said identification information and said reference information, said link forming circuit to execute external line origination by releasing at least one channel of said plurality of B channels in the busy condition.

12. The ISDN communication apparatus as set forth in claim 10, wherein said control circuit detects the end of communication after external line origination by releasing one channel of said plurality of B channels in the busy condition and resets the B channel released by controlling said link forming circuit depending on such detection to the condition before the channel is released.

13. The ISDN communication apparatus in the multiplex communication apparatus as set forth in claim 11, wherein said control circuit notifies, upon mismatching between said identification information and the reference information stored in said storing means, mismatching condition to said communication apparatus having requested said external line origination and releases one channel of said plurality B channels in the busy condition to make an external line origination upon confirming the input of a new special number from the terminal.

* * * * *